June 5, 1956  E. L. WHEELER  2,749,539
METHOD AND APPARATUS FOR DETECTING CHANGES IN A CONDITION
Filed April 15, 1953  4 Sheets—Sheet 1

Fig. 1.

INVENTOR
Elwood L. Wheeler.
BY Robert F. Peck
ATTORNEY

June 5, 1956 E. L. WHEELER 2,749,539
METHOD AND APPARATUS FOR DETECTING CHANGES IN A CONDITION
Filed April 15, 1953 4 Sheets-Sheet 2

Fig. 2.

INVENTOR
Elwood L. Wheeler.

BY Robert F. Peck

ATTORNEY

June 5, 1956  E. L. WHEELER  2,749,539
METHOD AND APPARATUS FOR DETECTING CHANGES IN A CONDITION
Filed April 15, 1953  4 Sheets-Sheet 3

INVENTOR
*Elwood L. Wheeler.*

BY *Robert F. Peck*
ATTORNEY

June 5, 1956     E. L. WHEELER     2,749,539
METHOD AND APPARATUS FOR DETECTING CHANGES IN A CONDITION
Filed April 15, 1953     4 Sheets-Sheet 4

INVENTOR
*Elwood L. Wheeler.*

BY *Robert F. Peck*
ATTORNEY

United States Patent Office 2,749,539
Patented June 5, 1956

2,749,539

METHOD AND APPARATUS FOR DETECTING CHANGES IN A CONDITION

Elwood L. Wheeler, Owings Mills, Md., assignor to Bendix Aviation Corporation, Baltimore, Md., a corporation of Delaware Application April 15, 1953, Serial No. 349,063

22 Claims. (Cl. 340—345)

This invention relates generally to improvements in condition responsive apparatus and, in particular, to an improved method and apparatus for detecting the changes in the magnitude of a condition wherein said condition is continuously changing in a unidirectional manner.

There are many applications wherein it is desirable to develop electrical signals responsive to unidirectional changes in the magnitude of a condition, wherein such signals are developed as a result of some form of electromechanical action, one form being the conversion of mechanical motion generated by a condition responsive element into an electric signal whose magnitude can be correlated to the magnitude of the condition being measured. For example, a barometic capsule responding to pressure, a bi-metallic element responding to temperature, or a hair element responding to humidity, provide a mechanical displacement which can be readily converted into electric values by a variety of existing means.

On familiar application operating in accordance with the aforesaid principle exists in the art of radio-meteorography, wherein conditions of the upper atmosphere are detected by suitable condition responsive elements and these elements translate the magnitude of the condition being sensed into radio signals which can be detected at suitable ground stations and then converted into data for use in weather forecasting and the like. Such familiar application is accomplished by means of a device known as a radiosonde, wherein a simple radio transmitter is carried aloft by a free ballon and the signal output of the transmitter is modulated by the ambient conditions of temperature, humidity and pressure.

An important component of a radiosonde is a part generally referred to as a baroswitch, which usually takes the form of an evacuated aneroid coupled to an electrical contact carrying arm adapted to be moved by the expansion of the aneroid across a series of fixed electrical contacts arranged in the form of an electric commutator. Each segment of the commutator is usually connected to an electrical circuit, forming a part of the radio transmitter, whereby the radio signals are suitably modulated whenever there is cooperation between the moving contact and any of the commutator segments.

Thus, from the above it is seen that the aneroid, in responding to ambient pressure, develops a mechanical displacement, which in turn drives the moving contact through a predetermined path to successively complete a number of circuits established by connection to the various segments forming the commutator pattern. An electromechanical action is thus obtained, it being only necessary to correlate the electrical signals to the mechanical displacement, which in turn will be indicative of changes taking place in the ambient pressure.

Normally, the baroswitches utilized in radiosondes do not actually give direct indications of pressure, but on the contrary perform a switching action wherein successive signals are generated proportional to ambient temperature and humidity, suitably interspersed by reference signals, and some means must be provided to convert these signals to pressure readings. The operation of the device may be such that predetermined groups of commutator segments are connected to a suitable temperature measuring circuit and other predetermined groups are connected to a suitable humidity measuring cicuit, or the operation may be such that each segment is connected to a relay having suitable contacts for controlling the temperature and humidity circuits connected thereto. In either case, such temperature and humidity measuring circuits normally utilize temperature or humidity responsive resistors, whose resistance values change in proportion to the changes taking place in the ambient temperature and humidity. These changes in resistance value can be reflected into the modulator section of the transmitter whereby the output signals are modulated in accordance therewith. Thus, a series of signals is obtained, each signal being an indirect indication of ambient pressure.

To obtain pressure data from the temperature and humidity signals generated by the transmitter, it is necessary to subject the baroswitch to a factory calibration check wherein the switch is subjected to the complete range of ambient atmospheric pressure, and the pressure corresponding to each commutator segment is recorded on a calibration chart for use in the field. Most commutators normally utilized in radiosonde circuits at the present time embody 80 or 150 commutator segments and it is therefore necessary to correlate each segment to its corresponding ambient pressure, the end result being a chart with 80 or 150 pressure readings properly correlated to the commutator segments.

Once the calibration chart is produced for a given baroswitch, subsequent flight of same will produce a series of temperature and humidity readings and the calibration chart will readily permit correlation of pressure to these readings. In this manner the pressure is measured indirectly during flight as a result of the direct measurement of pressure at the factory, at which time the calibration chart is obtained.

Such a method of measuring pressure, as set forth above, is quite practical for a limited number of pressure readings, such as the 80 or 150 utilized in current forecasting techniques. However, the trend in the art of radio meteorography is toward a vastly increased number of readings or soundings, as they may be aptly termed, and it becomes immediately obvious that the present system of measuring pressure is quite inadequate. For example, in the case of a radiosonde require to take 800 soundings of pressure through a flight, it is apparent that pre-calibration involving 800 pressure readings is complicated, costly, and quite cumbersome to follow in the field when consideration is given to the use of a chart embodying 800 pressure readings.

It is therefore apparent that a new approach must be found to measure pressure in a radiosonde involving large numbers of readings, or, for that matter, in any condition measuring system operating similarly to the radiosonde and involving large numbers of readings; and it is an important object of the present invention to provide a new and improved method and apparatus for obtaining a large number of soundings in a condition responsive system.

It is a further object of the present invention to increase the number of soundings in a unidirectional condition responsive system concurrently with a reduction in the number of precalibrated reference soundings.

It is a further object of the present invention to greatly increase the number of soundings in a unidirectional condition responsive system wherein simplicity and accuracy are completely compatible with economy of manufacture and facility of field use.

It is a still further object of the present invention to greatly increase the number of pressure soundings in a radiosonde system and at the same time provide for a substantially direct indication of pressure at the signal receiving station.

The above objects of the invention, together with the advantages and benefits attendant thereto, are accomplished by means of a unique commutator, which, in the embodiment illustrated, provides for 800 soundings covering the complete range in ambient atmospheric pressure, coupled with the relatively small number of 40 calibrated reference points. Furthermore, with only 40 predetermined check points for the baroswitch covering the entire range of pressure to be measured, the intermediate values of pressure are measured by a new and useful scheme based upon an interpolating principle. Of significant importance is the fact that each calibrated check point provides for identical electrical signals, which can be relied upon to transmit the pressure data and can also be used for checking the frequency of the radio transmitter. Interspersed between these calibrated signals are a series of coded signals which permit identification of all the signals through a complete measuring cycle, even though certain of the signals may fail to reach the ground-receiving equipment during a flight.

Compared to the devices heretofore known to the prior art, some of the advantages of the subject invention are immediately apparent. Thus, there are 800 soundings provided as compared to a maximum of 150 available heretofore. Furthermore, the problem of calibration is greatly reduced in that only 40 points need to be checked, whereas in the former devices the entire range had to be calibrated, which meant a minimum of 80 calibration points and a maximum of 150. Additionally, the use of predetermined signals for all of the soundings greatly simplifies the over-all system and permits ready and frequent checks in the output of the radio transmitter. Also, the simplified calibration chart, in combination with the novel method of coding the signals, greatly simplifies the reading, interpretation, and use of the readings taken in the field by the ground equipment.

For a complete understanding of the invention, the objects attained thereby, and the benefits and advantages to be derived therefrom, reference will be had to the detailed description set forth below, when taken in conjunction with the drawings annexed hereto, in which.

Figure 1:
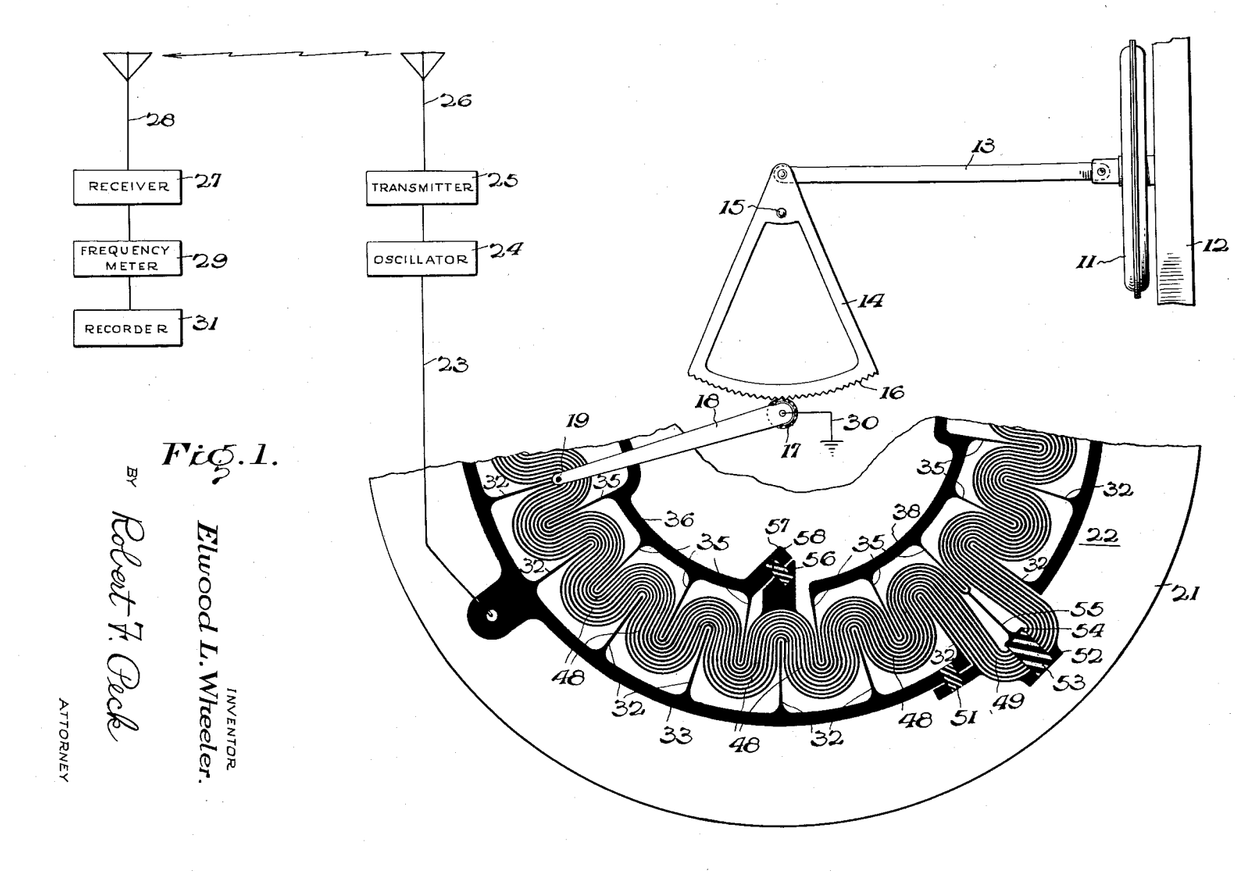
Figure 1 is a simplified schematic diagram showing the application of the invention to a complete radiosonde system.

Referring first to Figure 1, there is shown a pressure responsive capsule in the form of an aneroid 11, having one end suitably affixed to a supporting base 12 and its other end connected to a link 13. The link 13 is connected at its outer extremity to a sector gear 14, suitably pivoted as at 15 and having its teeth 16 cooperating with the pinion 17. Affixed to the shaft of pinion 17 is a contact carrying arm 18, having the electrical contact 19 affixed to its outer end.

Assuming the aneroid 11 to be substantially completely evacuated, the operation of the arrangement so far described will be immediately apparent, thus, as the assembly is subjected to progressively decreasing ambient pressure, the aneroid 11 will expand and, through its lever arm 13 and associated sector gear 14, cause the pinion 17 to rotate. Rotation of pinion 17 will also cause rotation of its associated contact carrying arm 18 and rotation of arm 18 will cause the contact 19 to describe a predetermined circular path in response to changes in ambient pressure.

Cooperating with the contact 19 is the commutator 21, which comprises the conducting pattern 22, carried by a suitable plastic supporting base. By suitable techniques, the contact pattern 22 can have the plastic molded around it so that the plastic performs the dual function of acting as a support and an insulation means between the different electrical paths making up the commutator pattern, and the usual construction is to have the conducting pattern flush with the surface of the plastic so that an inlaid effect is accomplished. Such an arrangement reduces to a minimum the frictional problems encountered by virtue of the sweeping contact 19.

The precise details of construction of the aneroid element and associated linkage, as well as the techniques of forming the commutator, have only been described in the very broadest of terms in view of the fact that such arrangements are old in the art and form no part of the subject invention, and hence have been omitted for the sake of brevity and clarity.

Still referring to Figure 1, the conducting pattern 22 is connected by means of lead 23 to an oscillator 24, which in turn is suitably connected to a radio transmitter 25 and its associated antenna 26. The arm 18 is suitably grounded at 30 and thus provides a return circuit for the oscillator through the conducting pattern 22. In a manner to be described below, the conducting pattern is provided with resistance values so that for any position of the arm 18 the contact 19 will complete the circuit to the oscillator through preselected values of electrical resistance. The oscillator 24 is of the blocking type and in the embodiment shown, will pulse-modulate the signal of the transmitter in accordance with values of resistance switched into the circuit by means of the moving contact 19. The modulation can be at an audio rate in the range of 100 to 500 cycles per second so as to permit the transmitter pulses to have a wide enough range to adequately cover the anticipated range in the conditions under observation. The carrier frequency of the transmitter may be on the order of 1680 megacycles per second, but of course it is to be understood that the frequency of the transmitter or the blocking rate of the oscillator can vary over any preselected range without departing from the scope of the invention. Furthermore, the carrier signal need not be pulse-modulated but can be modulated in any convenient manner. Additionally, it is not necessary to use a radio-telemetering system in connection with the present invention, as the invention can be adapted to many different forms of data transmission and conversion.

To receive the signals generated by the transmitter 25 there is a radio receiver 27 with its associated antenna 28. The receiver 27 is so constructed that it delivers an output signal having a varying frequency proportional to the magnitude of the condition influencing the signal generated by the transmitter 25. The varying frequency output of the receiver 27 is fed into a frequency meter 29, where such frequency can be converted into movement of an indicating arm cooperating with an associated scale calibrated at the audio range selected to modulate the signals generated by the transmitter 25. A suitable recorder 31, operating on the optical principle, scans the position of the indicator arm of the frequency meter to convert this position into data which can be recorded, a sample of such record appearing in Figure 4. The basic principle of operation of the receiver, frequency meter and recorder is described and illustrated in United States Patent Number 2,374,653, issued May 1, 1945, and further description of this part of the system is unnecessary and has been omitted for the sake of brevity.

Figure 2:
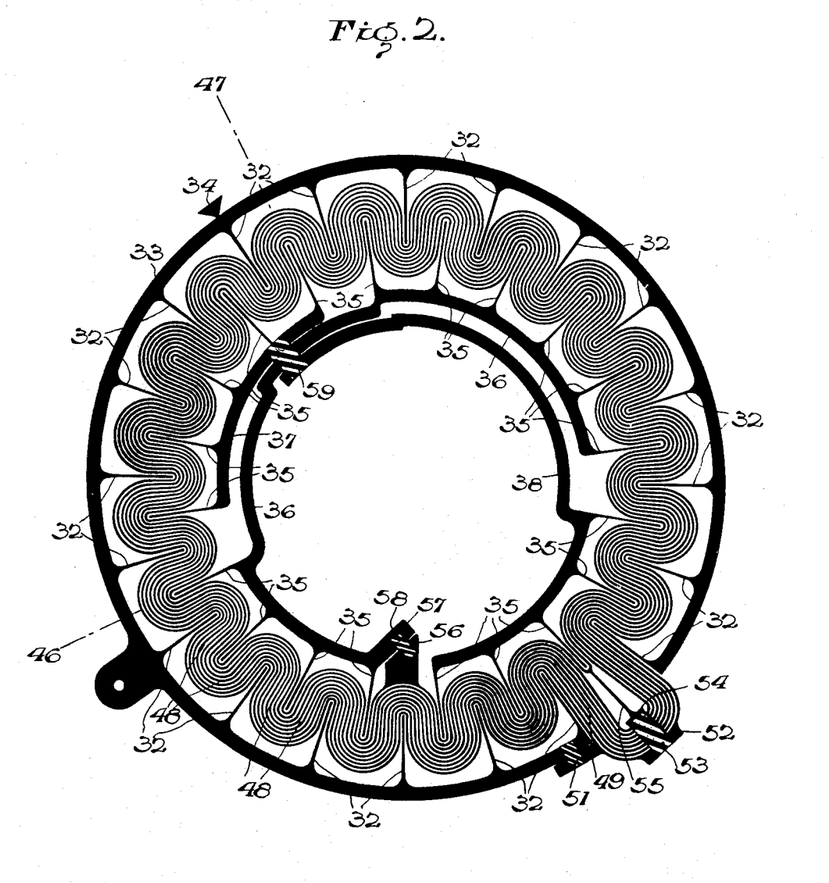
Figure 2 is a detailed showing of the novel commutator utilized in the system of Figure 1.

Referring now to Figure 2, a detailed explanation of the commutator will now be set forth. The conducting pattern 22 comprises a first set of spaced, fixed contacts 32 arranged along the path of the moving contact 19, such contacts being in the form of conducting segments lying transversely across the aforesaid path. All of these contacts 32 are interconnected by means of a first common electrical path 33, the path 33 being in turn connected by means of lead 23 to the oscillator 24. Any time the contact 19 lies upon any of the contacts 32, a first fixed signal is generated by transmitter 25.

In the embodiment shown, the apparatus is designed so that two complete revolutions of contact 19 are necessary to cover the complete pressure range being measured, and an examination of the pattern 22 will show 20 individual segments for the contacts 32, giving a total of 40 for the complete range in pressure to be measured. Assuming that the device is designed so that contact 19 will initially cooperate with the contact 32 opposite the small triangle 34, and further, assuming that the contact 19 moves in a counter-clockwise direction upon a decrease in ambient pressure, it is to be noted that as the pressure decreases, each segment of the contacts 32 will be successively contacted by the moving contact 19. Now if this portion of the equipment is subjected to a calibration in the factory, definite values of pressure can be allocated to each contact 32 as the contact 19 moves through the complete cycle of two revolutions, and a chart can be made showing this relationship. When a calibrated unit is used in the field, the record of the factory calibration will serve to indicate the atmospheric pressure existing at any point in the measuring cycle corresponding to cooperation of the contact 19 with the contacts 32. Furthermore, the correlation of the contact 32 opposite triangle 34 to a predetermined ambient pressure permits ready orientation of the device prior to use. Assuming this correlated pressure to be 1040 millibars, one using the device need only to know the true atmospheric pressure existing at the ground prior to flight. With this data available, mere inspection of the position of contact 19 will show whether or not any aberration in performance has occurred since the device was calibrated at the factory. Simple means (not shown) are provided to rotate the commutator 21, and if the position of contact 19 does not coincide with existing ground pressure, the commutator 21 can be moved slightly to bring the contact 19 into engagement with the proper segment. After this adjustment, the commutator is locked in position and the device can be used with full assurance that the starting position is completely correlated to existing starting pressures. Once this initial correlation exists, normal performance will result in correlated action throughout the complete range in pressure.

Bearing in mind that a fixed signal is generated whenever contact 19 cooperates with contact 32, it is apparent that some means must be provided to identify the particular signals at any time during the measuring cycle. This is highly desirable, for in the embodiment shown, the radio signals sometimes do not reach the ground equipment, and in the absence of station identifying means, the ground record would be subject to error in interpretation.

To this end, a second series of spaced, fixed electrical contacts 35 are arranged around the path described by contact 19, and again, like contacts 32, comprise a series of conducting segments arranged transversely across said path, each one of which is interspersed between the conducting segments of the contacts 32. Unlike the contacts 32, the contacts 35 are interconnected in preselected groups, the interconnecting portions of these groups comprising second paths in the form of annular inter-conducting paths 36, 37, 38.

The manner of interconnection of the contacts 35 is as follows: Starting with contact 19 opposite the triangle 34 and assuming counter-clockwise motion, the first contact 35 met by contact 19 is connected to path 36, the next three are connected to path 37, the next four are connected to path 36, the next five are connected to path 38, the next six are connected to path 36, the next one is connected to path 37, and then the pattern repeats itself for all successive revolutions of the contact 19.

In a manner to be described below, the inner paths 36, 37, 38 are interconnected to the outer path 33 in such a way that whenever the contact 19 cooperates with those contacts 35 affixed to the inner path 36, a fixed electrical signal is generated by the transmitter 25. Considering the signal generated by transmitter 25 when contact 19 cooperates with contacts 32 as a first electrical signal, the signal generated as set forth in the preceding sentence can be considered as a second electrical signal and this second signal is different in magnitude from the first signal and is interspersed between the first signals in a predetermined coded manner in accordance with the method of interconnection established by the paths 36, 37 and 38. Whenever contact 19 cooperates with those contacts 35 affixed to the inner paths 37 or 38, a third predetermined electrical signal is generated by transmitter and this third signal is different in magnitude from either the first or second signals.

Thus, in the arrangement so far described, we have three fixed signals being sequentially generated by the transmitter 25 in response to the unidirectional change in pressure sensed by the aneroid 11. The first signals correspond to all of the precalibrated contacts of the commutator 21, and the second and third signals are utilized for identifying any particular portion of the overall signal response controlled by the commutator 21.

Figures 3, 4:
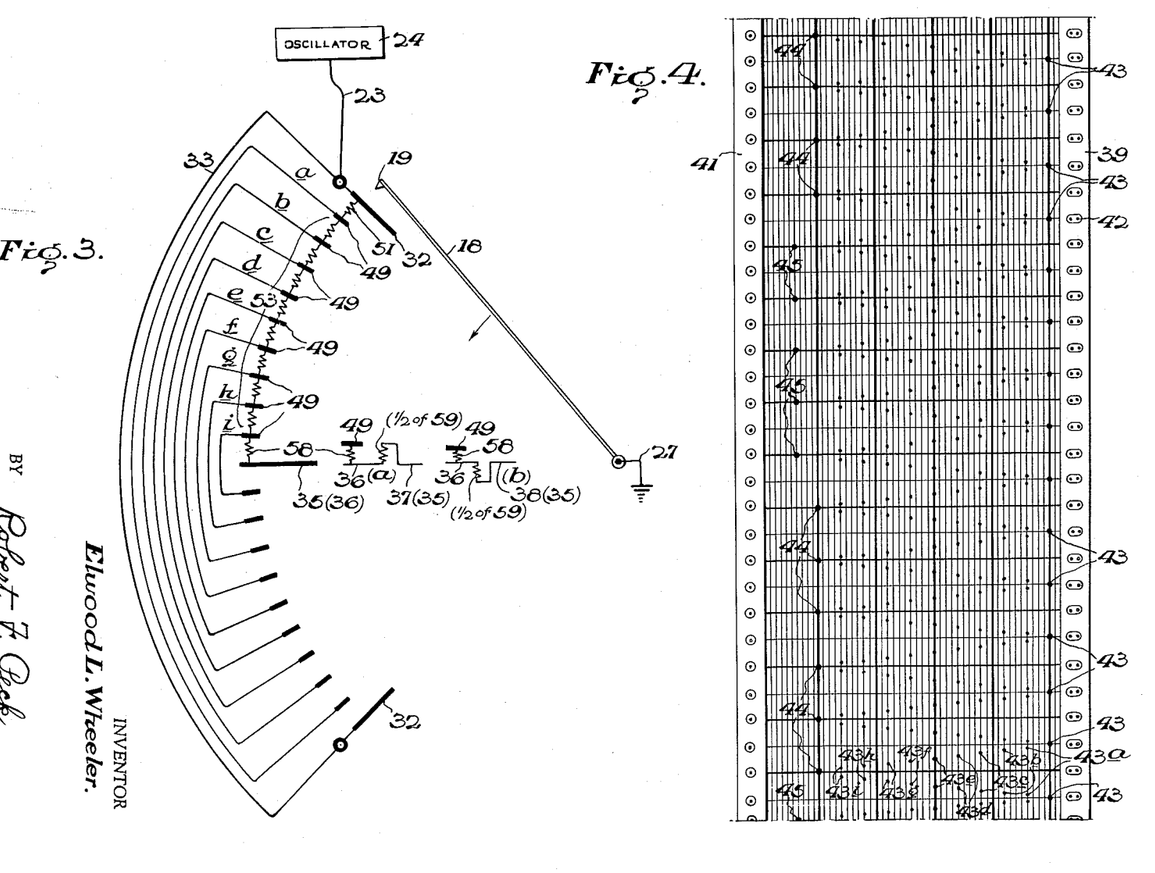
Figure 3 is an electrical schematic illustrating the principle of operation of the commutator shown in detail in Figure 2.
Figure 4 is a sample of the record produced by the system shown in Figure 1.

The aforesaid condition is graphically illustrated in Figure 4, wherein is illustrated a sample of the type of record produced by the subject invention. Referring to Figure 4, the chart is generally indicated at 39 and has a series of apertures 41, 42 along its marginal edges for cooperating with a suitable sprocket drive forming a part of the recorder 31. The horizontal coordinates of the chart 39 represent elapsed time and the vertical coordinates represent the spread between the first, second and third signals generated by the transmitter 25. The points indicated by 43 along the right hand edge of the chart 39 correspond to the repetitive recording of the first fixed signals generated by cooperation of the contact 19 with the contacts 32. The points on the chart indicated by 44 reflect the points along the commutator where the moving contact 19 cooperates with those contacts 35 connected to inner conducting path 36, and the points designated at 45 reflect the signals generated by the transmitter whenever the moving contact 19 cooperates with those contacts 35 affixed to either one of the paths 37 or 38.

Assuming the chart 39 to be moving upwardly with respect to the sheet of drawings on which it is presented, it is to be noted that the path of travel of the contact 19 represented by the markings on the chart 39 is between the lines 46 and 47 on Figure 2. Therefore, any preselected point 43 on chart 39 can be immediately correlated to its corresponding calibration chart by reference to the coding furnished by the points 44 or 45.

In the arrangement so far described, and assuming that only the contacts 32 are precalibrated, the known record shown by chart 39 would consist of only the series of markings 43 corresponding to each one of the contacts 32. The intermediate pressure existing between the contacts 32 would be unknown, so that it is necessary to provide some means for developing signals reflecting such intermediate pressures.

To this end a series of third fixed contacts 48 are arranged in each of the spaces between the contacts 32 and 35, and these contacts 48 have a portion in the form of conducting segments 49, arranged transversely to the path of moving contact 19. All of the segments 49 lying between the contacts 32 and 35 are interconnected, whereby a series of third electrical paths are established, the total number of such paths equaling the total number of segments 49 lying between adjacent segments of contacts 32 and 35. It is to be noted that the segments 49 and their interconnecting parts form a series of sinuous conducting paths arranged in a serpentine manner around the fixed contacts 32 and 35, first bending under the contacts 32 and then bending over the contacts 35, and then repeating this arrangement for the entire 360 degree pattern. In the embodiment shown there are nine of the segments 49 lying between the contacts 32, 35, thus producing nine serpentine paths. Another way of describing the interconnecting arrangements for the segments 49 would be to say that in any two adjacent groups of these segments the innermost segments are connected together to form a continuous path, the next innermost segments are connected together to form another continuous conducting path, and so on, until the outermost segments are reached, which are also connected together to form still another continuous conducting path.

Looking at the segments 49 from the standpoint of the moving contact 19, and assuming the contact 19 to be moving across these segments from the starting point identified by the triangle 34, the contact 19 will first contact the fixed contact 32 and then the first segment of the contacts 48 will be contacted, and so on through the series of segments of contacts 48, until the fixed contact 35 is reached. Further motion of contact 32 will repeat the pattern established between the contacts 32 and 35 but in the opposite sense, that is, the first segment 49 to be contacted will be the last one contacted in the prior group, and so on until the last segment contacted will correspond to the first contacted in the prior group. Now if equal values of impedance exist between each of the serpentine paths, it will be apparent that motion of contact 19 across the segments 49 will increase the impedance in a step by step manner through one series of the segments, and then decrease it in a like manner for the next succeeding series, alternately reversing this pattern throughout the cycle of operation.

With all of the serpentine paths interconnected and also connected to path 33, motion of contact 19 across the segment 49 will result in a series of fourth predetermined signals. The device has been designed so that these fourth signals lie in the range between the first signal and either the second or third signal, this feature to be described in greater detail below. Suffice to say at this point, the fourth signals provide a means of measuring and reading the pressure existing between the known pressures indicated by the first signals.

As has been heretofore stated, the different conducting paths of the commutator 21 are all interconnected by suitable impedance means, and in the embodiment shown this is accomplished by means of electrical resistance paint. Such paints are well known in the art and their compositions, techniques in coating, and variations of both, are described in two bulletins published by the National Bureau of Standards, one entitled "Printed Circuit Techniques," Circular No. 468, issued November 15, 1947, the other being entitled "New Advances in Printed Circuits," Miscellaneous Publication 192, issued November 22, 1948. Suffice to say that these paints or coatings can be applied evenly and in such a way that a uniform resistance gradient exists across any preselected length and width.

The manner in which the electrical resistance paint is used to interconnect the various conducting paths of the commutator 21 is shown quite clearly in Figure 2, wherein the outer annular conducting path 33 is connected to an enlarged portion affixed to an elongated segment 49 by means of the electrical resistance paint coating 51. A second enlarged portion 52 on the same segment 49 provides one extremity for another resistance coating which serves to interconnect all of the sinuous paths formed by the interconnection of contacts 48. It is to be noted that adjacent series of segments 49, at the point where the resistance paint is applied, are elongated and actually extend beyond the outer conducting path 33. This provides sufficient expansion of the contact pattern at this point to permit convenient application of the resistance coating 53, one end of which is connected to the enlarged portion 52 and the other end of which is connected to an enlarged tip 54 of the common segment 55 extending from the innermost segments 49.

To interconnect the inner paths 36, 37, 38 to the outer path 33, through the sinuous paths, there is an enlarged portion 56 extending from the proper inner sinuous path to cooperate with an enlarged portion 57 of path 36, between and over which may lie the resistance paint 58.

Where portions of the paths 36, 37, 38 are adjacent one another, a resistance paint 59 is applied across the paths to interconnect same, it being noted that the contacts 35 underlying the resistance paint 59 are connected directly to path 36 and the path 37, which is divided in two to permit the contact 35 to come through to path 36 at this point, has both halves connected to path 36 by the paint 59, the path 38 also being connected to path 36 by the paint 59.

The aforesaid construction and the method of its use, can be best understood upon reference to the simplified schematic shown in Figure 3. Thus, there is shown a portion of the conducting pattern 22, bounded by a pair of fixed contacts 32. The interconnection of these contacts 32 is indicated by the line 33 corresponding to the outer annular conducting path. The resistance paint 51 interconnecting path 33 with the series of sinuous paths is shown between the contact 32 and the outermost segment 49. Each one of the segments 49 is shown as interconnected by substantially equal resistors, the sum total of which represent the resistance paint 53. The resistor paint 58 is represented on this schematic as lying between the inner segment 49 and the fixed contact 35. In this schematic, contact 35 also represents inner path 36, the schematic arrangement for paths 37 and 38 being shown in those portions of the schematic identified as (a) and (b). Thus, referring to (a), we again see the innermost segment 49 connected to the conducting path 36 by means of the resistance 58 and path 36 in turn is connected to path 37 by means of a portion of resistance 59, represented on the schematic as a resistor of substantially one-half of the total resistance of resistance paint 59.

In the arrangement shown in (b), innermost segment 49 is again shown as connected to inner path 36 by means of resistance paint 58, and in this case the other half of the resistance paint 59 is utilized to connect the paths 36 and 38, and this connection is shown as a resistor representing substantially one-half of resistance paint 59.

Going beyond the fixed contact 35, it is readily seen how segments 49 in the bottom half of the schematic, are interconnected to the segments in the top half, and so on, down to the fixed contact 32.

For convenience and simplicity in the particular embodiment chosen to illustrate the invention, resistance paint 51, resistance paint 53, resistance paint 58, and resistance paint 59 are all carefully compounded and applied in such a way that approximately equal values of resistance interconnect the various conducting paths. Thus, substantially equal resistance exists between path 33 and the outer sinuous path, between each sinuous path, between the inner sinuous path and path 36, between path 36 and 37, and between path 36 and 38. In all cases, the resistance chosen amounted to approximately 2,000 ohms.

Considering the operation of the device, and still referring to Figure 3, let us assume that the contact 19 first cooperates with fixed contact 32. In this position there is a direct connection from the oscillator 24 to ground via the lead 23, conducting path 33, contact 32, contact 19, arm 18, and ground connection 30. As the contact 19 moves on to the segment 49, the oscillator ground circuit is changed by virtue of the resistance 51 being now connected into the circuit. This change in resistance will change the circuit parameters existing in the oscillator and thus change its blocking rate to thereby modulate the signals generated by transmitter 25. Looking at chart 39 in Figure 4, and remembering that the points 43 represent the electrical signals generated when the contact 19 is cooperating with fixed contacts 32, the point 43 (a) will show the change in signals caused by the introduction of the resistance 51 into the oscillator to ground circuit. As the contact 19 moves to the next segment 49, a portion of resistance 53 is inserted into the oscillator to ground circuit, thereby further modulating the signal generated by transmitter 25, this condition being shown on chart 39 as 43 (b). As contact 19 progressively meets the succeeding segments 49, the signal generated by transmitter 25 will be successively modulated and these points are shown on the diagram as 43(c), 43(d), 43(e), 43(f), 43(g), 43(h) and 43(i).

Assuming next that the moving contact 19 meets with one of the contacts 35 affixed to inner path 36, the resistance 58 will be next inserted in the oscillator to ground circuit and this will cause further modulation of the signal generated by transmitter 25, this signal being represented on chart 39 by the point 44.

Now upon further motion of contact 19 beyond contact 35, the next segment 49 to be met is the last one that was met in the prior series, thus giving rise to a signal represented by 43(i) on chart 39. Further motion of contact 19 will cause successive signals to be generated, identified in the following order: 43(h), 43(g), 43(f), 43(e), 43(d), 43(c), 43(b) and 43(a), and then 43.

In the event that the moving contact 19 cooperates with any of the contacts 35 affixed to inner path 37 or inner path 38, it will be apparent that in either case an additional resistance value is introduced into the oscillator to ground circuit. This additional resistance value is approximately one-half of resistance 59 and the insertion of this additional resistance will cause further modulation of the signal generated by the transmitter 25, this condition being graphically shown on chart 39 by the points 45.

From the above it will be immediately apparent that the points 43(a) to 43(i), inclusive, extending between the points 43 and either of the points 44 or 43, provide the necessary pressure data between successive calibrated points 43. It has been found that the variation in pressure existing between any pair of contacts 32 is substantially a straight line function so that the pressure gradient existing can be determined by simple arithmetic interpolations. Thus, we have nine steps between each of the fixed contacts 32 and 35, each step representing a definite value of pressure and with each step properly correlated to the base points 43, the instantaneous values of pressure existing at the various steps can be easily ascertained. Furthermore, the coded arrangement of the contacts 35, provided by the inner paths 36, 37 and 38, permits for quick and easy identification of any portion of the pressure measuring cycle. For example, if for some reason, complete reception is impossible and certain of the check points or intermediate points cannot get through to a receiver, the coded arrangement of the contacts 35, even if a few of these are missing, are such that very little difficulty will be encountered in properly correlating the chart record to the actual flight conditions.

From the above, it is apparent that approximately 800 soundings are obtained by means of the novel commutator described herein, and further, it will be apparent that the pre-calibration is vastly simplified in that only 40 contacts need to be precalibrated for the complete range of atmospheric pressure change. Furthermore, because a fixed signal is used for all of the calibrated check points, this fixed signal can serve the dual purpose of transmitting pressure information and at the same time providing a reference frequency for the purpose of checking the frequency output of the transmitter 25. The arrangement so far described has been limited to a device for measuring the unidirectional change in one condition, namely, barometric pressure. Obviously, the arrangement would work equally as well with other conditions, such as temperature, humidity, or for that matter, any other variable, subject, of course, to the limitation that the variable can only change in one direction. It makes no difference whether the variation increases constantly or decreases constantly, but there can be no reversals during the cycle.

Figure 5:
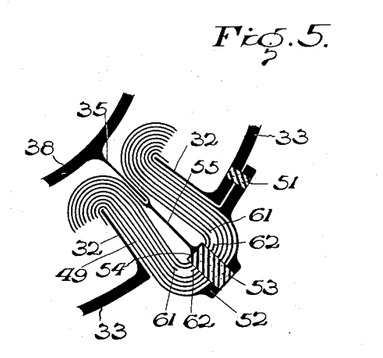
Figure 5 is a partial view of a permissible modification of the commutator shown in Figure 2.
Figure 6:
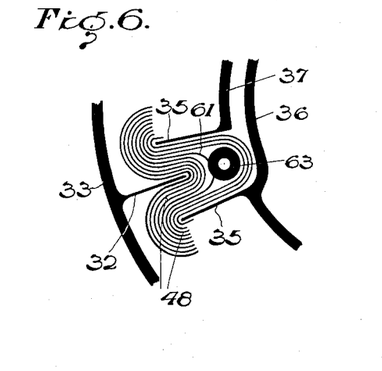
Figure 6 is another partial view of the commutator shown in Figure 2 illustrating another portion of the modified embodiment to be used in connection with Figure 5.
Figure 7:
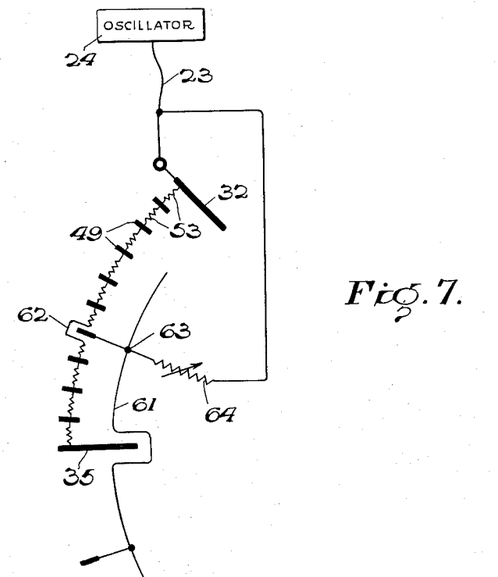
Figure 7 is a partial schematic illustrating the principle of operation of the modifications shown in Figures 5 and 6.

In the event that it is desirable to utilize the above discussed principles for a two-condition measuring system, the embodiments shown in Figures 5, 6 and 7 can be relied upon. In this modified form, one of the sinuous paths is isolated electrically from the remainder of the conducting paths established by commutator 21, and the isolated path is connected to a second measuring circuit responding to a second condition. For example, if it is found desirable to measure temperature, in addition to pressure, a thermistor can be arranged in a suitable circuit connected to oscillator 24 to thereby modulate the signal generated by transmitter 25 in accordance with the changes in the resistance of the thermistor. As is well known in the art, a thermistor comprises an electrical resistor having a negative temperature coefficient of resistance, and with the proper range in resistance values selected, a signal can be generated by transmitter 25 different in magnitude from any of the signals generated through the influence of the various conducting paths of the commutator 21. Referring first to Figure 5, it is seen how one of the sinuous paths is electrically isolated from the remainder of the paths without in any way distrubing the inner-connecting effect of the resistance paint 53. In this case, one of the paths, identified as 61, is separated on both sides of paint 53, leaving a small portion 62 still remaining underneath the paint 53 to provide for the necessary interconnection of the various conducting paths. This arrangement is shown in the partial schematic shown in Figure 7, the small portion 62 constituting the jumper inter-connecting the sinuous paths on opposite sides of the path 61.

To show how the isolated path 61 can be connected to a second external electrical circuit, reference is had to Figure 6 wherein the conducting segments 49 have been elongated inwardly at a suitable spot along the commutator pattern providing for a spacing in between the sinuous paths for placement of a terminal point 63. The thermistor 64 can be connected to the path 61 by means of a suitable lead brought to the terminal point 63, the thermistor in turn being connected to the oscillator 24 by another suitable electrical lead. Thus, whenever the contact 19 strikes the segments 49, forming the isolated path 61, the oscillator to ground circuit is modified by the inclusion of the thermistor 64 in the circuit, and with this element responding to temperature to give rise to a change in resistance, it is quite apparent that suitable modulation of the signals generated by transmitter 25 will occur in response to temperature throughout the measuring cycle. With the proper selection of the total resistance change occurring in the thermistor 64, a signal can be generated which at all times is different from any of the signals generated by the remainder of the conducting paths.

Although all of the arrangements so far described utilize electrical resistance paint as the basic interconnecting component for all of the conducting paths, the principle of operation of the device would be unaffected by the use of other types of resistor components, or by the substitution of inductance or capacitance components for the resistor components illustrated. In other words, so long as the commutator pattern remains undisturbed, the type of impedance means utilized to interconnect the conducting paths will not cause the device to deviate in any way from its fundamental principle of operation, as the external electrical circuits can be readily modified to accommodate the form of impedance selected.

Finally, the conducting pattern 22 is shown in annular form for application to a radiosonde system, deviations from this arrangement are readily permissible without in any way affecting the fundamental principle of operation.

What is claimed and desired to be secured by United States Letters Patent is:

1. In a system responding to a continuous unidirectional change in the magnitude of a condition, the combination of: means to sequentially develop a series of substantially identical first predetermined electrical signals corresponding to a series of predetermined magnitudes of said condition, means to intersperse a second predetermined electrical signal between first preselected pairs of said first signals, said signals being different in magnitude from said first signals, means to intersperse a third predetermined electrical signal between second preselected pairs of said first signals, said third signals being different in magnitude from said first and second signals, said second and third signals being arranged sequentially in a predetermined coded manner.

2. The combination defined by claim 1 including means to intersperse a group of fourth predetermined electrical signals between each of said first signals and either said second or third signals, each of said fourth signals being different in magnitude from each other and from said first, second and third signals.

3. In a system responding to a continuous unidirectional change in the magnitude of a condition, the combination of: means to sequentially develop a series of substantially identical first predetermined electrical signals corresponding to a series of predetermined magnitudes of said condition, means to intersperse a second predetermined electrical signal between first preselected pairs of said first signals, said second signals being different in magnitude from said first signals, means to intersperse a third predetermined electrical signal between second preselected pairs of said first signal, said third signals being different in magnitude from said first and second signals, said second and third signals being arranged sequentially in a predetermined coded manner, means to intersperse a group of fourth predetermined electrical signals between each of said first signals and either said second or third signals, each of said fourth signals being different in magnitude from each other and from said first, second and third signals, said fourth signals covering the range in magnitude between the first signal and either said second and third signals, and each of said fourth signals sequentially and progressively changing in magnitude upon a change in said condition, said change in said fourth signals being in one sense between said first signal and either said second or third signals and in the opposite sense between either said second or third signals and said first signal.

4. In a system responding to a continuous unidirectional change in the magnitude of a condition, the combination of: an electrical contact member, means for moving said member in response to changes in magnitude of a condition, a first group of spaced, fixed electrical contact means cooperating with said contact member, means to generate a first predetermined electrical signal whenever said contact member cooperates with any of said first fixed contacts, a second series of spaced, fixed electrical contacts cooperating with said contact member, each of said second fixed contacts being interspersed between a pair of said first contacts, means to generate a second predetermined electrical signal when said contact member cooperates with a predetermined first series of said second fixed contacts, said second electrical signal being different in magnitude from said first electrical signal, means to generate a third predetermined electrical signal when said contact member cooperates with a predetermined second series of said second fixed contacts, said third signal being different in magnitude from said first and second signals, said second and third signals being arranged in a predetermined coded manner.

5. The combination defined by claim 4 wherein a group of third spaced, fixed electrical contacts is interspersed between each of said first and second fixed contacts and cooperates with said contact member and means are provided to generate a group of fourth predetermined electrical signals when said contact member cooperates with said group of third fixed contacts, each signal in said group of fourth signals being different in magnitude from each other and from said first, second and third signals.

6. In a system responding to a continuous unidirectional change in the magnitude of a condition, the combination of: an electrical contact member, means for moving said member in response to changes in magnitude of a condition, a first group of spaced, fixed electrical contact means cooperating with said contact member, means to generate a first predetermined electrical signal whenever said contact member cooperates with any of said first fixed contacts, a second series of spaced, fixed electrical contacts cooperating with said contact member, each of said second fixed contacts being interspersed between a pair of said first contacts, means to generate a second predetermined electrical signal when said contact member cooperates with a predetermined first series of said second fixed contacts, said second electrical signal being different in magnitude from said first electrical signal, means to generate a third predetermined electrical signal when said contact member cooperates with a predetermined second series of said second fixed contacts, said third signal being different in magnitude from said first and second signals, said second and third signals being arranged in a predetermined coded manner, a group of third spaced, fixed electrical contacts interspersed between each of said first and second fixed contacts and cooperating with said contact member, means for generating a group of fourth predetermined electrical signals when said contact member cooperates with said group of third fixed contacts, each signal in said group of fourth signals being different in magnitude from each other and from said first, second and third signals, said group of fourth signals having a range in magnitude covering the range in magnitude between said first signal and either said second or third signals, said fourth signals progressively changing in magnitude in one sense when said contact member is moving from said first fixed contact to said second fixed contact and progressively changing in the opposite sense when said contact member is moving from said second fixed contact to said first fixed contact.

7. The combination defined by claim 6 in which all of said first fixed contacts are connected together, each corresponding contact in said third series of fixed contacts being connected together, and preselected groups of said second contacts are connected together, all of said contacts being connected to an external electrical circuit.

8. The combination defined by claim 7 wherein a preselected contact in each group of third contacts are connected together to form a conducting path, said path being electrically isolated from all other contacts, said path being connected to a second external electrical circuit, said second circuit including measuring means responsive to a second condition, and means are provided to develop a fifth signal whenever said moving contact cooperates with said preselected third contact, said fifth signal varying through a range in magnitude in response to changes in said second condition, each of said fifth signals being different in magnitude from any of said first, second, third or fourth signals.

9. In a system responding to a continuous unidirectional change in the magnitude of a condition, the combination of: moving electrical contact means, means for moving said contact means through a predetermined path in response to changes in magnitude of a condition, a plurality of equally spaced first fixed electrical contact means arranged along said path to cooperate with said moving contact, all of said first fixed contacts being connected together to form a first electrical conducting path, a plurality of equally spaced second fixed electrical contact means arranged along said path to cooperate with said moving contact, preselected groups of said second fixed contacts being connected together to form a plurality of second electrical conducting paths, each of said first and second fixed contacts comprising first and second conducting segments arranged transversely across the path of said moving contact and being alternately disposed along said path, third fixed electrical contact means arranged along said path in each of the spaces between said first and second fixed contacts to cooperate with said moving contact, each of said third contact means comprising a series of equally spaced third conducting segments arranged transversely across the path of said moving contact, all of said series being interconnected whereby in any adjacent pair of said series the innermost segments of each series are connected together, the next innermost segments of said series are connected together, and so on, to the outermost segments of series which are also connected together, such interconnections forming a group of third electrical conducting paths, means including first impedance means for connecting said first path to the path established by the interconnection of the outermost segments of adjacent series of said third segments lying between a preselected pair of said first fixed contacts, means including second impedance means for connecting a preselected path of said group of second paths to the path established by the interconnection of the innermost segments of said preselected adjacent series, means including third impedance means connected between each adjacent path of said group of third paths, and means including fourth impedance means connected between said preselected path of said group of second paths and all other paths of said second group of paths, said first path being adapted for connection to an external electrical circuit, a first electrical condition existing in said circuit when said moving contact cooperates with any one of said first fixed contacts, a second electrical condition different from said first electrical condition existing in said circuit when said moving contact cooperates with any one of said second fixed contacts forming part of said preselected second path, a third electrical condition different from said first and second electrical conditions existing in said circuit when said moving contact cooperates with any one of said second fixed contacts forming parts of the balance of said group of second paths, a fourth electrical condition covering the range in said condition between said first and said second or third conditions existing in said circuit when said moving contact cooperates with said third contacts, said fourth condition changing progressively in one sense as said moving contact moves from said first fixed to said second fixed contact and changing progressively in the opposite sense when said moving contact moves from said second fixed contact to said first fixed contact.

10. The combination defined in claim 9 wherein one of said third paths is electrically isolated from the remainder of said paths and is adapted for connection to a second external electrical circuit, said second circuit including measuring means for responding to a second condition whereby a fifth electrical condition can be established different from said first, second, third, or fourth conditions whenever said moving contact cooperates with the contacts in said isolated third path.

11. The combination defined by claim 9 wherein said third contacts and the interconnections between each series of said third contacts comprise a series of substantially parallel spaced sinuous paths.

12. The combination defined by claim 11 wherein said moving contact travels through a circular path and all of said contacts are arranged around said path, having their individual segments extending radially with respect to said path, and the interconnections between said first and second fixed contacts comprise a plurality of concentrically arranged spaced electrical paths.

13. The combination defined by claim 12 wherein said first fixed contacts project inwardly from an outer circular electrical conducting path, said second fixed contacts project outwardly from a series of inner arcuate electrical conducting paths, and said sinuous paths formed by the interconnection of said third contacts follows a serpentine path first over said second fixed contacts and then under said first fixed contacts.

14. The combination defined by claim 13 wherein all of said contacts and associated interconnecting parts comprise an electrical conducting material inlaid in a substantially annular plastic body, and said first, second, third and fourth impedance means comprise thin coatings of electrical resistance paint applied to the various interconnecting portions of the circuit.

15. The combination defined by claim 14 wherein the preselected adjacent series of third contacts have their segment portion elongated outwardly to extend beyond said outer conducting path, the innermost pair of third segments of said preselected series being extended outwardly by means of a single segment having an enlarged end portion, the interconnecting portion of the outermost segments of said adjacent series having an enlarged portion, electrical resistance paint overlying said third contacts between that portion of the contacts embraced by said enlarged segment portions, a second enlarged portion extending from said outermost segments and adjacent said first path, electrical resistance paint overlying said second enlarged portion and a portion of said adjacent first path, an enlarged portion extending from the inner path of said third contacts and adjacent to an enlarged portion extending from the preselected inner path, electrical resistance paint overlying said last named enlarged portions, there being second and third inner paths individually connected to said preselected inner path by means of electrical resistance paint.

16. The combination defined by claim 15 wherein said second fixed contacts are connected to said first, second and third inner paths in a predetermined coded manner.

17. The combination defined by claim 16 wherein the second fixed contacts are connected to their respective inner paths so that upon counter-clockwise motion of said moving contact there will first be cooperation between said moving contact and one of said contacts attached to said first inner path, the next three successive contacts being attached to said second path, the next four successive contacts being attached to said first path, the next five successive contacts being attached to said third path, the next six successive contacts being attached to said first path, the next successive contact being attached to said second path, after which the sequence will repeat itself.

18. The combination defined by claim 17 wherein the resistance between said first and second inner paths is substantially equal to the resistance between said first and third inner paths.

19. The combination defined by claim 18 wherein substantially equal electrical resistance exists between all of said third conducting paths.

20. The combination defined by claim 19 wherein that portion of a preselected one of said third paths underlying the resistance paint interconnecting the said third paths is electrically isolated from the remainder of said preselected paths, there being a connection from the remainder of said preselected third path to a second external electrical circuit, said second circuit including measuring means for responding to a second condition whereby an electrical condition can be established in said second circuit whenever said moving contact cooperates with said preselected path, said electrical condition varying through a range covering the change in said second condition.

21. In a system for transmitting meteorolgical information by modulating the carrier wave of a radio transmitter to obtain signals representative of atmospheric conditions, a contact member adapted to be inserted in the modulation control circuit of the transmitter, means for imparting unidirectional movement to said contact member in relation to changes in atmospheric pressure, a commutator provided with a multiple of spaced contacts which when wiped by said contact member insert predetermined values of resistances in said circuit, said contacts including a group of reference contacts to be precalibrated as a function of pressure and assigned appropriate values on a recording chart, a group of identifying contacts interspersed between the contacts of said reference group to produce signals which when recorded assist in identifying the precalibrated reference contacts, resistances connected in circuit with the identifying contacts having values such as will result in identifying signals of different magnitude with respect to the signals produced by said precalibrated contacts, certain of said identifying contacts being arranged in groups with each group interconnected by a common circuit, said common circuits incorporating resistances of different values in order to produce groups of identifying signals of different magnitude.

22. In a system for transmitting meteorological information by modulating the carrier wave of a radio transmitter to obtain signals representative atmospheric conditions, a contact member adapted to be inserted in the modulation control circuit of the transmitter, means for imparting unidirectional movement to said contact member in relation to changes in atmospheric pressure, a commutator provided with a multiple of spaced contacts which when wiped by said contact member insert predetermined values of resistances in said circuit, said contacts including a group of reference contacts to be precalibrated as a function of pressure and assigned appropriate values on a recording chart, a group of identifying contacts interspersed between the contacts of said reference group to produce signals which when recorded assist in identifying the precalibrated reference contacts, resistances connected in circuit with the identifying contacts having values such as will result in identifying signals of different magnitude wth respect to the signals produced by said precalibrated contacts, and a series of intermediate reference contacts interposed between each of said precalibrated contacts and its associated identifying reference contact, said intermediate reference contacts being connected in circuit with said precalibrated and identifying contacts through resistances having predetermined stepped values.

References Cited in the file of this patent
UNITED STATES PATENTS

| | | |
|---|---|---|
| 2,283,919 | Diamond et al. | May 26, 1942 |
| 2,295,570 | Dunmore | Sept. 15, 1942 |